May 26, 1953    W. J. BUFORD    2,639,540
CRAB TRAP
Filed May 1, 1950
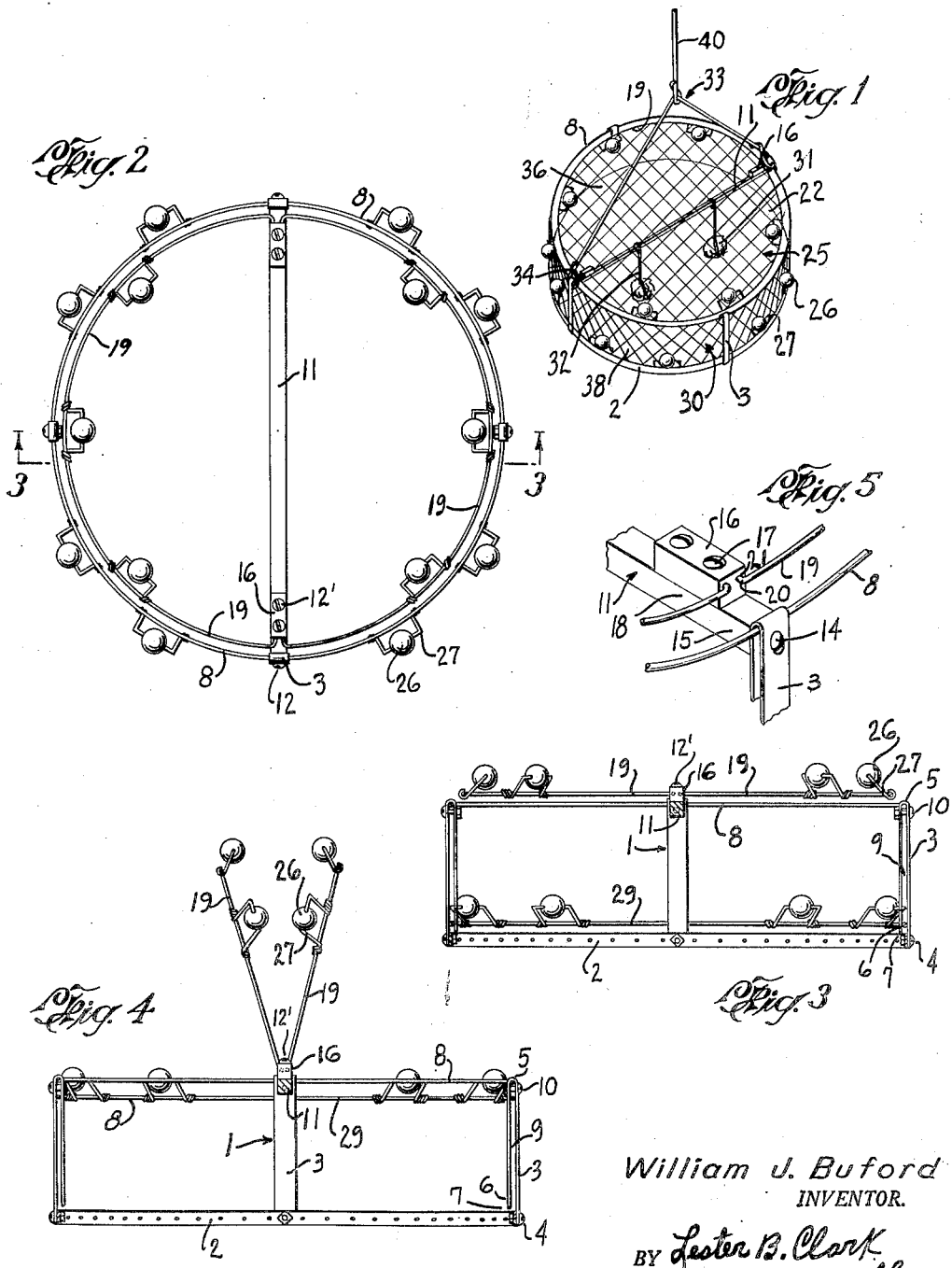
William J. Buford
INVENTOR.
BY Lester B. Clark
+ Ray L. Smith
ATTORNEYS Patented May 26, 1953

2,639,540

UNITED STATES PATENT OFFICE 2,639,540

CRAB TRAP

William J. Buford, Houston, Tex.

Application May 1, 1950, Serial No. 159,248

3 Claims. (Cl. 43—102)

1

This invention relates to a crab trap which has a positive opening action upon being lowered into the water and which has a positive closing action upon being raised from the water.

It is an object of this invention to provide a crab trap which opens due to buoyant means on the sides and top when lowered into the water, and which closes upon being raised due to water pressure upon the sides and top.

It is a further object of this invention to provide a crab trap which is of light, inexpensive construction, yet which is adapted to present an expanse of open surface when in the water to entice crabs to the bait therein, yet which is also adapted to quickly and positively close to entrap a number of crabs therein when raised from the water.

Other and further objects will be apparent when the specification is considered in connection with the drawings in which:

Fig. 1 is a perspective view of the crab trap in closed position, the bait being shown on the crossbar.

Fig. 2 is a plan view of the crab trap when closed, the mesh being omitted.

Fig. 3 is a sectional side elevation taken along line 3—3 of Fig. 2 showing the crab trap when closed, the mesh being omitted.

Fig. 4 is a sectional side elevation taken along line 3—3 of Fig. 2 showing the crab trap when open, the mesh being omitted.

Fig. 5 is a fragmentary perspective view showing the construction of crossbar, top rims, top ring, and side straps.

The frame 1 of the crab trap comprises the bottom ring 2 which has the side straps 3 radially spaced therearound and connected thereto by the nuts and bolts 4 to upstand thereabove. The side straps are recurved at 5 and extend back downwardly to terminate at 6 slightly above the bottom ring 2. This leaves the openings 7 through which the top ring 8 may be inserted to be moved upwardly within the slots 9 to a top point substantially within the recurved strap portions 5, to be confined therein by the bolts 10 extending through the strap 3 immediately therebelow.

The frame 1 is completed by the crossbar 11 which extends diametrically across the top ring 8 to be held in place by screws 12 insertable through the holes 14 in the strap 3 and threadable into the crossbar ends 15. The crossbar 11 includes a lug 16 at either end thereof within the top ring 8 and such lug is connected to the crossbar by means of screws 12' insertable through the holes 17 in the lug 16, and threadable into the crossbar portion 18.

2

The arcuate or substantially semicircular rims 19 are substantially of, but slightly less than, the radius of the top ring 8, and are curved at the ends 20 to pivotally connect the rims to the crossbar lugs 16 by interfitting into the holes 21 therein. Mesh 22, as crisscrossed twine, is connected to the crossbar 11 and extends to the periphery of each rim 19 to complete the lids 25 of the crab trap. A series of floats 26, of a buoyant material, as cork, are connected by means 27, at radially spaced distances along each rim 19. These floats 26 are of a size and buoyancy, by comparison with the weight of the lids 25, and the friction of their pivotal connection to the lugs 16, to insure that the lids will pivot upwardly, as shown in Fig. 4, upon contact with the water.

Mesh 22 is also connected to the top ring 8 and extends therefrom downwardly for substantially the height of the straps 3, and is connected to the slidable ring 29 to complete the curtain or side closure member 30. This ring 29 is of a diameter to fit within the slots 9, and is insertable in assembly into these slots through the openings 7. Floats 26 are also connected by means 27 to the slidable ring 29, and these floats are of a size and buoyancy, by comparison with the weight of the side 30, and the friction of the ring 29 in the straps 3, to insure that the side or curtain 30 floats upwardly upon contact with the water.

In operation bait 31 may be hung by strings 32 preferably upon the crossbar 11 to extend within the crab trap. The buoyancy of the floats 26 insures motion of the movable top and side assembly comprising the lids and side curtain so that the lids 25 open and the side curtain 30 rises as the crab trap is lowered into the water by means of the cord 40 connected to the bail 33 which in turn is connected at 34, adjacent the lugs 16, to diametrically opposite sides of the frame 1. When, or before the trap comes to rest, crabs and similar marine life may freely enter the side and top of the trap to have access to the bait 31.

When the trap is lifted, as by an upward pull on the bail 33, the weight and exposed surface of the lids and side curtain are sufficient, when exposed to the water pressure thereupon as the trap moves upwardly, to insure that the lids close, and the slidable ring 30 moves to lowermost position in the slots 9 to close the side curtain 30.

As the bottom 36 is also covered with a circle of mesh 22 connected peripherally to the bottom ring 2 to complete the trap, any crabs or marine life of a size too large to pass through the mesh openings 38, are confined within the trap, between the bottom 36, side curtain 30, and lids 25.

The theory of this invention may be carried out by structures varying from the modification disclosed, and variation in construction is broadly claimed therefor.

Broadly this invention includes a trap for marine life, as crabs, which is adapted to present an open top and sides when lowered into the water to give free access to the bait or lures suspended therewithin, and which is adapted, upon being lifted upwardly within the water to have both sides and top closed by water pressure to positively entrap the catch within the trap.

What is claimed is:

1. In a crab trap, the combination of a bottom member, a mesh cover for said bottom member, side straps upstanding from said bottom member comprising guide slots, a top ring connected to the top of said side strap, a side closure member comprising a ring slidable in said guide slots, and mesh connected at the top to said top ring and extending downwardly for connection to said slidable ring, a crossbar extending between diametrically opposite side straps at substantially the top thereof, a pair of mesh covered, semi-circular lids pivotally connected to said crossbar at substantially the ends thereof, and float means on said lid and on the curved peripheries of said slidable ring.

2. In a trap to be submerged in water to entrap marine life, the combination of a bottom member including a mesh cover, a frame connected to said bottom member and upstanding therefrom, a top and side assembly movably connected to said frame, a mesh cover for said top and side assembly, said frame including means constraining said assembly to move upwardly and downwardly with relation to said frame, said assembly when in lower position being adapted to complement said bottom to enclose a space, and float means on said assembly normally holding said assembly in upper position in the water, said frame providing means for the application thereto of an upward lifting force whereby upon the application of said upwardly lifting force the water resists the upward passage of said float means and of said assembly to urge said assembly to lower position.

3. In a crab trap, the combination of a frame including a bottom member, a mesh cover for said bottom member, side members connected to said bottom member and upstanding therefrom, said side members providing downwardly opening guide slots, side means connected to the top of said frame and normally extending to the bottom thereof, a mesh cover for said side means, a lid pivotally connected to said frame, a mesh cover for said lid, and float means on said lid and said side means to be buoyed upwardly as said trap is lowered into the water thereby opening said lid and raising said side means upwardly in said guide slots, the lifting of said trap causing the water to resist the upward passage of said lid and said side means to force said lid and side means downwardly to closed position.

WILLIAM J. BUFORD.

References Cited in the file of this patent

UNITED STATES PATENTS

| Number | Name | Date |
|---|---|---|
| 1,447,502 | Asanio et al. | Mar. 6, 1923 |
| 1,607,443 | Cormier | Nov. 16, 1926 |
| 1,958,724 | Stanislaw | May 15, 1934 |